US008033817B2

(12) United States Patent
Tsay et al.

(10) Patent No.: US 8,033,817 B2
(45) Date of Patent: Oct. 11, 2011

(54) MULTI-ROD MECHANISM FOR LINEARLY ACTUATING FOR OPENING AND CLOSING A MOLD DEVICE

(75) Inventors: Der-Min Tsay, Kaohsiung (TW); Hsin-Pao Chen, Hualien County (TW); Shih-Han Chen, Taipei County (TW)

(73) Assignee: National Sun Yat-Sen University of Kaohsiung, Kaohsiung (TW)

( * ) Notice: Subject to any disclaimer, the term of this patent is extended or adjusted under 35 U.S.C. 154(b) by 157 days.

(21) Appl. No.: 12/547,631

(22) Filed: Aug. 26, 2009

(65) Prior Publication Data

US 2011/0048152 A1 Mar. 3, 2011

(51) Int. Cl.
*B29C 33/22* (2006.01)
*B29C 49/56* (2006.01)

(52) U.S. Cl. ........ 425/451.5; 74/519; 425/541; 425/592

(58) Field of Classification Search .................. 425/541, 425/451.5, 451.6, 592, 593; 74/469, 519
See application file for complete search history.

(56) References Cited

U.S. PATENT DOCUMENTS

| 722,822 | A | * | 3/1903 | Doughty | 425/541 |
|---|---|---|---|---|---|
| 2,975,473 | A | * | 3/1961 | Hagen et al. | 425/541 |
| 3,849,049 | A | * | 11/1974 | Brieschke et al. | 425/541 |
| 3,877,861 | A | * | 4/1975 | Kiefer et al. | 425/541 |
| 4,092,883 | A | | 6/1978 | Kindelan | |
| 4,283,218 | A | | 8/1981 | Staley | |
| 4,801,260 | A | * | 1/1989 | Oles et al. | 425/541 |
| 6,837,699 | B2 | * | 1/2005 | Jandura | 425/451.5 |
| 7,364,422 | B2 | * | 4/2008 | Canossi | 425/541 |

FOREIGN PATENT DOCUMENTS

TW 580423 3/2004

* cited by examiner

*Primary Examiner* — James Mackey
(74) *Attorney, Agent, or Firm* — Alan Kamrath; Kamrath & Associates PA

(57) ABSTRACT

A multi-rod mechanism includes at least one ternary link and a plurality of binary links. The ternary link and the binary links are connected between a first fixing pivot point and a second fixing pivot point to form a combination of the ternary link and the binary links. The combination of the ternary link and the binary links is designed to provide a first movable pivot point and a second movable pivot point between the first fixing pivot point and the second fixing pivot point. In operation, the ternary link and the binary links are rotated to move the first movable pivot point and the second movable pivot point toward or away from each other in opposite directions.

16 Claims, 4 Drawing Sheets

MULTI-ROD MECHANISM FOR LINEARLY ACTUATING FOR OPENING AND CLOSING A MOLD DEVICE

BACKGROUND OF THE INVENTION

1. Field of the Invention

The present invention relates to a multi-rod mechanism for linearly actuating for opening and closing a mold device. More particularly, the present invention relates to the multi-rod mechanism utilizing at least one ternary link and a plurality of binary links to synchronously actuate a plurality of mold members for generating linear movements for opening and closing the mold device in opposite directions.

2. Description of the Related Art

Taiwanese Patent Pub. No. 355441 discloses a conventional mold clamping device including a crank mechanism, a front plate, a rear plate and a movable plate. The crank mechanism includes a crank axle and a crank arm, and the front plate, the rear plate and the movable plate are arranged on two pull rods. The front plate and the rear plate are connected the crank arm with two connecting rods so as to actuate the front plate and the movable plate for generating a movement for opening and closing the mold device. With regard to the problematic aspects naturally occurring during use of the mold clamping device, the crank mechanism is susceptible to inefficiency due to the fact that the crank mechanism must bear the weight of the rear plate and the pull rods.

Taiwanese Patent Pub. No. 381539 discloses another conventional mold opening/closing device including two fixed mold seats and two slidable molds. The slidable mold is slidably mounted on a plurality of guiding rods. Each set of the fixed mold seat and the slidable mold is formed with a lock device which includes a toggle mechanism and a drive unit. The drive unit is formed with a set of pneumatic cylinders or hydraulic cylinders and is used to drive the toggle mechanism for actuating the slidable molds for opening and closing the mold device. However, the primary problem with such a mold opening/closing device is the need of a sophisticated process for adjusting the pneumatic cylinders or hydraulic cylinders.

Taiwanese Patent Pub. No. 580423 discloses another conventional mold opening/closing device for a resin sealing mechanism including an upper metal plate, a first lower metal plate, a second first lower metal plate, a drive unit (including a hydraulic cylinder) and a connection rod mechanism. The drive unit is used to actuate an upward movement and a downward movement of the first lower metal plate. The connection rod mechanism connects the first lower metal plate with the second first lower metal plate such that the motive power of the first lower metal plate is transmitted to the second first lower metal plate. With regard to the problematic aspects naturally occurring during use of such a mold opening/closing device, the drive unit is susceptible to inefficiency due to the fact that the drive unit must be used to drive the first lower metal plate and the second first lower metal plate. Hence, there is a need of improving the mold opening/closing device described in Taiwanese Patent Pub. Nos. 355441, 381539 and 580423.

The mold opening/closing device has been described in several issued patents, for example, including Taiwanese patent issued Pub. Nos. 459648, 334925, 313955, 137366 and 130647, and U.S. Pat. Nos. 4,283,218 and 4,092,883. Each of the above-mentioned is incorporated herein by reference for purposes including, but not limited to, indicating the background of the present invention and illustrating the state of the art.

As is described in greater detail below, the present invention provides a multi-rod mechanism for linearly actuating for opening and closing a mold device. At least one ternary link and a plurality of binary links are utilized to synchronously actuate a plurality of mold members for generating linear movements for opening and closing the mold device in opposite directions in such a way as to mitigate and overcome the above problem.

SUMMARY OF THE INVENTION

The primary objective of this invention is to provide a multi-rod mechanism for linearly actuating for opening and closing a mold device. At least one ternary link and a plurality of binary links are utilized to linearly actuate a plurality of mold members for generating linear movements for opening and closing the mold device in opposite directions. Accordingly, the efficiency and reliability of opening and closing operation of the mold device can be increased.

Another objective of this invention is to provide a multi-rod mechanism for linearly actuating for opening and closing a mold device. At least one ternary link and a plurality of binary links are utilized to synchronously actuate a plurality of mold members for generating linear movements for opening and closing the mold device in opposite directions. Accordingly, the efficiency and reliability of opening and closing operation of the mold device can be increased.

The multi-rod mechanism in accordance with an aspect of the present invention includes at least one ternary link and a plurality of binary links. The ternary link and the binary links are connected between a first fixing pivot point and a second fixing pivot point to form a combination of the ternary link and the binary links. The combination of the ternary link and the binary links is designed to provide a first movable pivot point and a second movable pivot point between the first fixing pivot point and the second fixing pivot point. In operation, the ternary link and the binary links are actuated to move the first movable pivot point and the second movable pivot point toward or away from each other in opposite directions.

The multi-rod mechanism in accordance with a separate aspect of the present invention includes a first ternary link, a second ternary link and a plurality of binary links. The first ternary link, the second ternary link and the binary links are connected between a first fixing pivot point and a second fixing pivot point to form a combination of the first ternary link, the second ternary link and the binary links. The first ternary link corresponds to the first fixing pivot point, while the second ternary link corresponds to the second fixing pivot point. The combination of the first ternary link, the second ternary link and the binary links is designed to provide a first movable pivot point and a second movable pivot point between the first fixing pivot point and the second fixing pivot point. In operation, the first ternary link, the second ternary link and the binary links are actuated to move the first movable pivot point and the second movable pivot point toward or away from each other in opposite directions.

The multi-rod mechanism in accordance with a separate aspect of the present invention includes a ternary link and a plurality of binary links. The ternary link and the binary links are connected between a first fixing pivot point and a second fixing pivot point to form a combination of the ternary link and the binary links. The ternary link corresponds to the fixing pivot point, while two of the binary links correspond to the second fixing pivot point. The combination of the ternary link and the binary links is designed to provide a first movable pivot point and a second movable pivot point between the first fixing pivot point and the second fixing pivot point. In operation, the ternary link and the binary links are actuated to move the first movable pivot point and the second movable pivot point toward or away from each other in opposite directions.

In a further separate aspect of the present invention, the first fixing pivot point is arranged at a first fixed seat.

In a yet further separate aspect of the present invention, the second fixing pivot point is arranged at a second fixed seat.

In a yet further separate aspect of the present invention, the first movable pivot point is arranged at a first slidable mold.

In a yet further separate aspect of the present invention, the second movable pivot point is arranged at a second slidable mold.

Further scope of the applicability of the present invention will become apparent from the detailed description given hereinafter. However, it should be understood that the detailed description and specific examples, while indicating preferred embodiments of the invention, are given by way of illustration only, since various modifications will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

It is noted that a multi-rod mechanism linearly actuating a mold device in accordance with the preferred embodiment of the present invention can be applicable to a wide variety of injection mold devices, stamping mold devices or the like, which is not limitative of the present invention.

Figure 1:
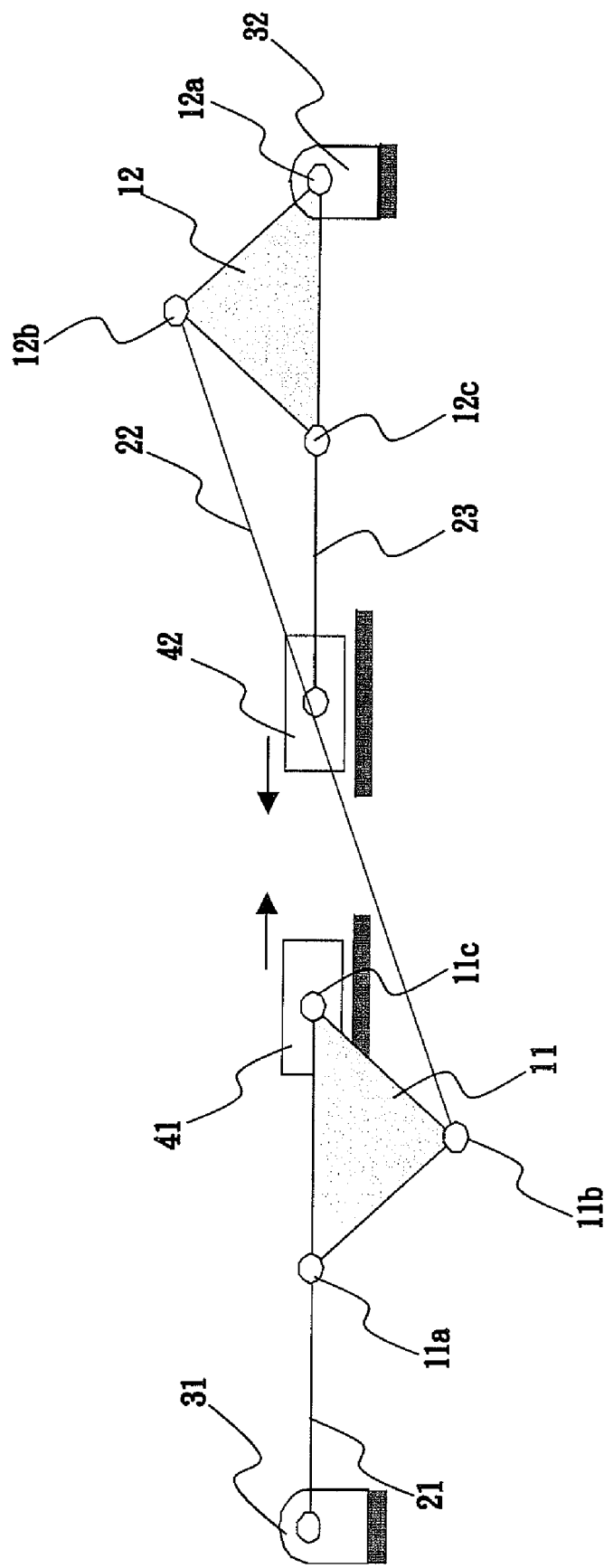
FIG. 1 is a schematic view of a multi-rod mechanism linearly actuating a mold device, which is in a closing operation, in accordance with a first embodiment of the present invention.

FIG. 1 illustrates a multi-rod mechanism linearly actuating a mold device, which is in a closing operation, in accordance with a first embodiment of the present invention. Referring to FIG. 1, the multi-rod mechanism in accordance with the first embodiment of the present invention includes a first ternary link 11, a second ternary link 12, a first binary link 21, a second binary link 22 and a third binary link 23. Each of the ternary links 11, 12 is designed for having predetermined size and shapes. Correspondingly, each of the binary links 21, 22 23 is designed for having predetermined lengths and shapes. The simple shapes and configurations of the ternary links 11, 12 and the binary links 21, 22 23, indicated in FIG. 1, are shown for simplification of description and not by way of limitation.

Still referring to FIG. 1, the first ternary link 11, the second ternary link 12, the first binary link 21, the second binary link 22 and the third binary link 23 are connected between a first fixing pivot point and a second fixing pivot point. In a preferred embodiment, the first fixing pivot point is arranged at or connected with a first fixed seat 31, while the second, fixing pivot point is arranged at or connected with a second fixed seat 32. The first ternary link 11 and the first binary link 21 correspond to the first fixed pivot point, while the second ternary link 12, the second binary link 22 and the third binary link 23 correspond to the second fixed pivot point. Furthermore, the combination of the first ternary link 11 and the first binary link 21 is designed to provide a first movable pivot point which is arranged at or connected with a first slidable mold 41. Correspondingly, the combination of the second ternary link 12, the second binary link 22 and the third binary link 23 is designed to provide a second movable pivot point which is arranged at or connected with a second slidable mold 42. It is intended that the first fixed seat 31, the second fixed seat 32, the first slidable mold 41 and the second slidable mold 42 may take on many configurations and constructions without departing from the scope of the present invention.

Still referring to FIG. 1, the first ternary link 11 includes a first connection point 11a, a second connection point 11b and a third connection point 11c. Correspondingly, the second ternary link 12 includes a first connection point 12a, a second connection point 12b and a third connection point 12c. Furthermore, each of the first binary link 21, the second binary link 22 and the third binary link 23 includes a first connection point (not labeled) and a second connection point (not labeled). In assembling operation, the first connection point 11a and the second connection point 11b of the first ternary link 11 is correspondingly connected with each of the first connection points of the first binary link 21 and the second binary link 22 by suitable connection members. The second connection point 12b and the third connection point 12c of the second ternary link 12 are correspondingly connected with the second connection point of the second binary link 22 and the first connection point of the third binary link 23 by suitable connection members.

With continued reference to FIG. 1, the first connection point 11a of the first ternary link 11 is pivotally connected with the first connection point of the first binary link 21, and the second connection point of the first binary link 21 is pivotally connected with the first fixed seat 31 such that the first fixing pivot point is formed. The second connection point 11b of the first ternary link 11 is pivotally connected with the first connection point of the second binary link 22. The third connection point 11c of the first ternary link 11 is pivotally connected with the first slidable mold 41 such that the first movable pivot point is formed, as best shown in the left side of FIG. 1.

With continued reference to FIG. 1, the first connection point 12a of the second ternary link 12 is pivotally connected with the second fixed seat 32 so as to form the second fixing pivot point. The second connection point 12b of the second ternary link 12 is pivotally connected with the second connection point of the second binary link 22. The third connection point 12c of the second ternary link 12 is pivotally connected with the first connection point of the third binary link 23, and the second connection point of the third binary link 23 is pivotally connected with the second slidable mold 42 such that the second movable pivot point is formed, as best shown in the right side of FIG. 1.

Figure 2:
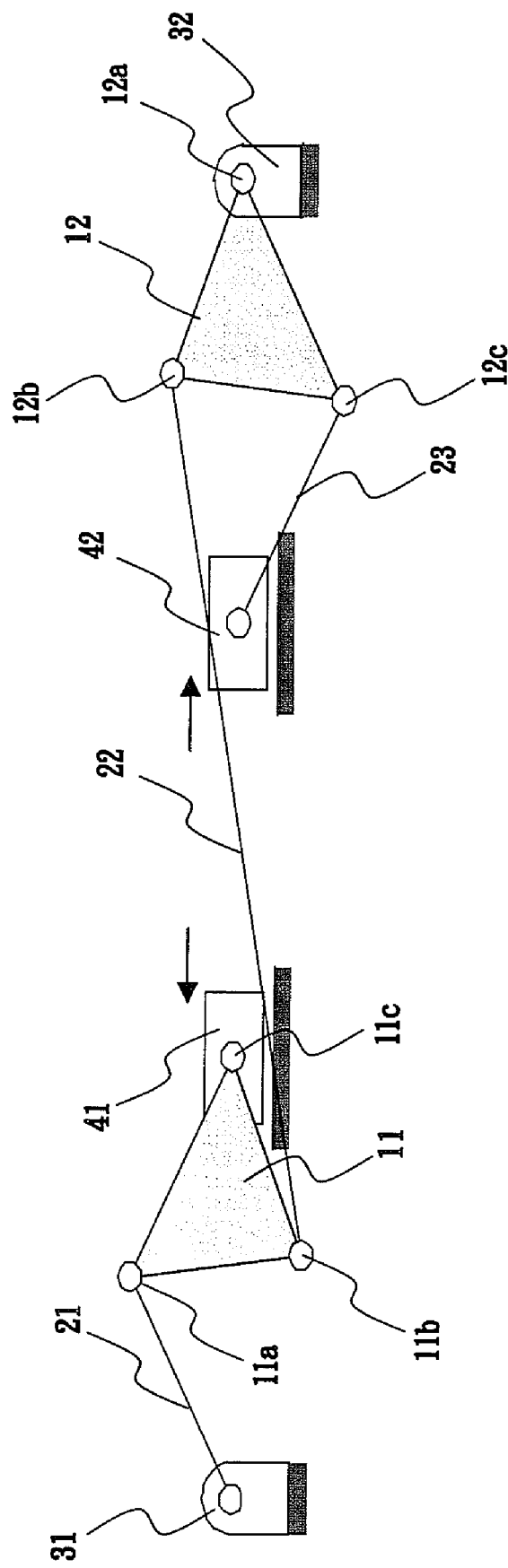
FIG. 2 is a schematic view of the multi-rod mechanism linearly actuating the mold device, which is in an opening operation, in accordance with the first embodiment of the present invention depicted in FIG. 1.

FIG. 2 illustrates the multi-rod mechanism linearly actuating the mold device, which is in an opening operation, in accordance with the first embodiment of the present invention. Referring to FIG. 2, in mold opening operation, the first slidable mold 41 and the second slidable mold 42 are actuated to linearly move a predetermined distance away from each other in opposite directions. Conversely, in a mold closing operation, the first slidable mold 41 and the second slidable mold 42 are actuated to linearly move a predetermined distance toward each other in opposite directions, as best shown in FIG. 1, and will be stopped at original positions thereof.

Referring again to FIG. 1, it is assumed that the positions of the first slidable mold 41 and the second slidable mold 42 are in the closed state of the mold device. Referring again to FIG. 2, in mold opening operation, for example, a motor device or a cam-linkage mechanism may be used to rotate the first binary link 21 or the second ternary link 12 a predetermined angle such that the first slidable mold 41 and the second slidable mold 42 are linearly moved a predetermined distance away from each other in opposite directions (in the directions indicated by arrows in FIG. 2). By way of example, a cam-linkage mechanism may be used to actuate the second connection point 11b of the first ternary link 11 to move a predetermined distance such that the first slidable mold 41 and the second slidable mold 42 are linearly moved a predetermined distance away from each other in opposite directions. In a further alternative, a hydraulic or cam-linkage mechanism may be used to actuate the multi-rod mechanism of the present invention so as to linearly move the first slidable mold 41 and the second slidable mold 42 a predetermined distance away from each other in opposite directions.

Figure 3:
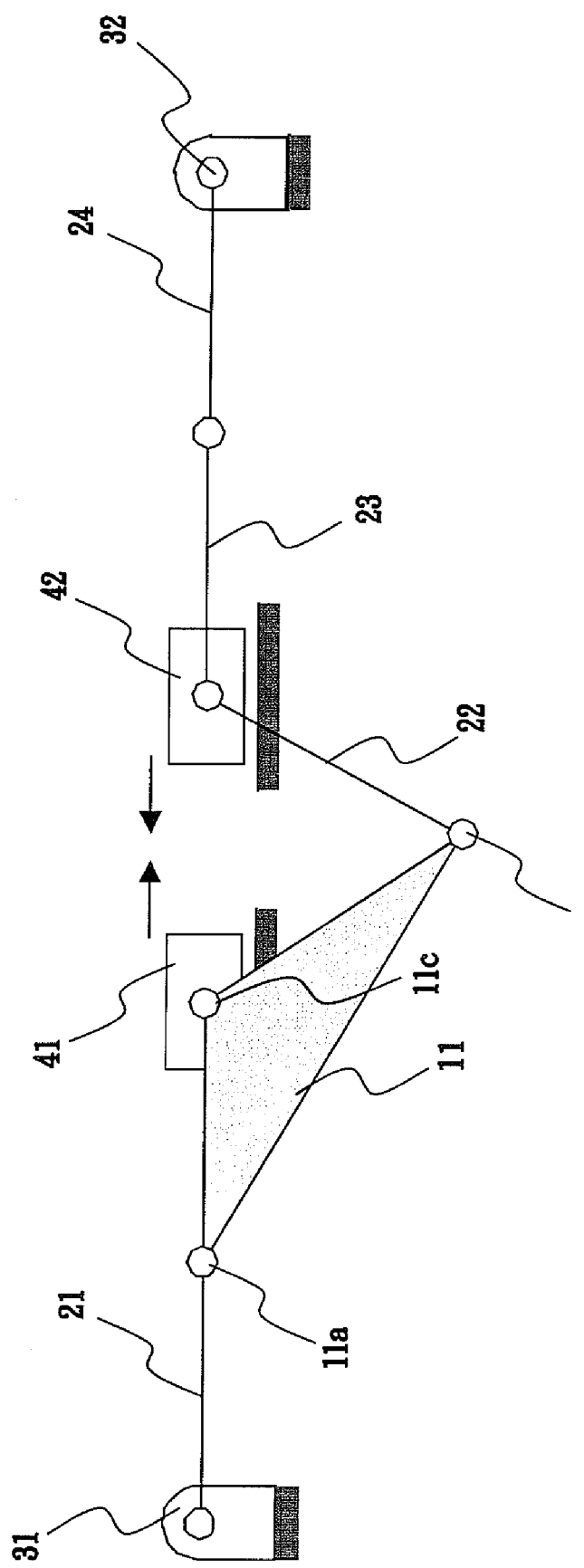
FIG. 3 is a schematic view of a multi-rod mechanism linearly actuating a mold device, which is in a closing operation, in accordance with a second embodiment of the present invention.
Figure 4:
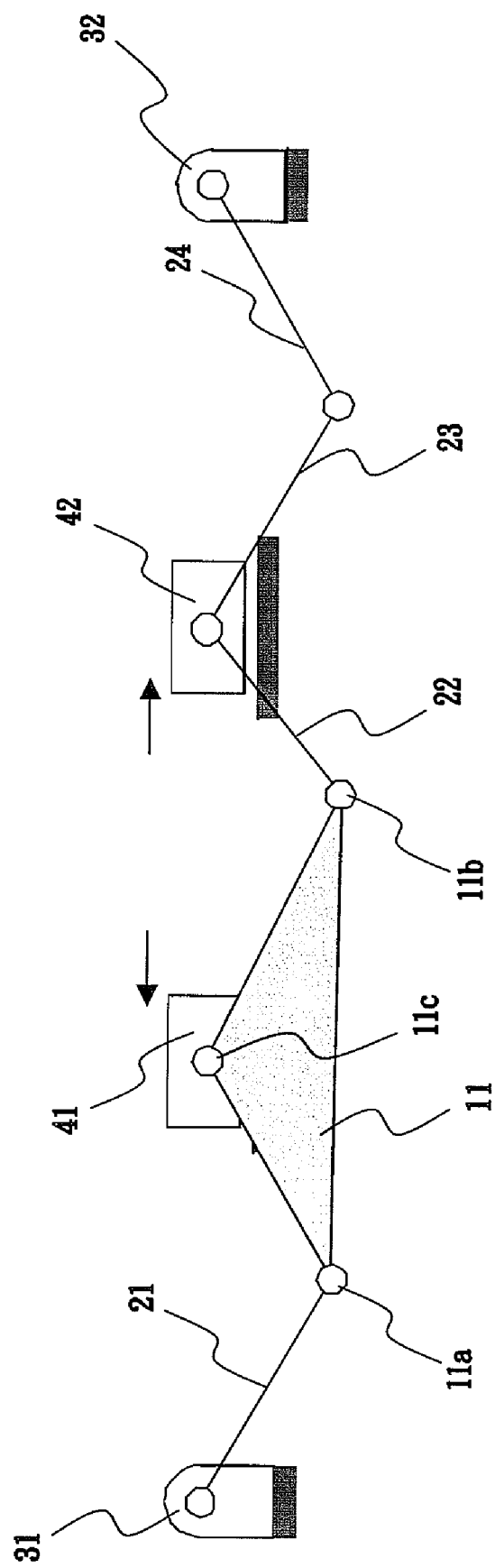
FIG. 4 is a schematic view of the multi-rod mechanism linearly actuating the mold device, which is an opening operation, in accordance with the second embodiment of the present invention depicted in FIG. 3.

Turning now to FIGS. 3 and 4, a multi-rod mechanism linearly actuating a mold device, which is in a closing/opening operation, in accordance with a second embodiment of the present invention is shown. Referring to FIGS. 3 and 4, the multi-rod mechanism in accordance with the second embodiment of the present invention includes a first ternary link 11, a first binary link 21, a second binary link 22, a third binary link 23 and a fourth binary link 24.

Still referring to FIG. 3, the first ternary link 11 includes a first connection point 11a, a second connection point 11b and a third connection point 11c. Furthermore, each of the first binary link 21, the second binary link 22, the third binary link 23 and the fourth binary link 24 includes a first connection point (not labeled) and a second connection point (not labeled). In assembling operation, the first connection point 11a and the second connection point 11b of the first ternary link 11 is correspondingly connected with each of the first connection points of the first binary link 21 and the second binary link 22, and the third binary link 23 and the fourth binary link 24 are connected.

With continued reference to FIG. 3, the first connection point 11a of the first ternary link 11 is pivotally connected with the first connection point of the first binary link 21, and the second connection point of the first binary link 21 is pivotally connected with the first fixed seat 31 such that the first fixing pivot point is formed. The second connection point 11b of the first ternary link 11 is pivotally connected with the first connection point of the second binary link 22. The third connection point 11c of the first ternary link 11 is pivotally connected with the first slidable mold 41 such that the first movable pivot point is formed, as best shown in the left side of FIG. 3.

With continued reference to FIG. 3, the first connection point of the fourth binary link 24 is pivotally connected with the second fixed seat 32 so as to form the second fixing pivot point. The second connection point of the fourth binary link 24 is pivotally connected with the first connection point of the third binary link 23. The second connection point of the second binary link 22 and the second connection point of the third binary link 23 are pivotally connected with the second slidable mold 42 such that the second movable pivot point is formed, as best shown in the right side of FIG. 3.

Referring again to FIG. 3, it is assumed that the positions of the first slidable mold 41 and the second slidable mold 42 are in the closed state of the mold device. Referring again to FIG. 4, in mold opening operation, for example, a motor device or a cam-linkage mechanism may be used to rotate the fourth binary link 24 a predetermined angle such that the first slidable mold 41 and the second slidable mold 42 are linearly moved a predetermined distance away from each other in opposite directions (in the directions indicated by arrows in FIG. 4). By way of example, a hydraulic or cam-linkage mechanism may be used to actuate a position between the third binary link 23 and the fourth binary link 24 to move a predetermined distance such that the first slidable mold 41 and the second slidable mold 42 are linearly moved a predetermined distance away from each other in opposite directions.

Although the invention has been described in detail with reference to its presently preferred embodiments, it will be understood by one of ordinary skill in the art that various modifications can be made without departing from the spirit and the scope of the invention, as set forth in the appended claims.

What is claimed is:

1. A multi-rod mechanism comprising:
   at least one ternary link; and
   first, second and third binary links, with the at least one ternary link and the first, second and third binary links connected between a first fixing pivot point and a second fixing pivot point, with a first combination comprising the at least one ternary link pivotally connected to the first binary link, with the first binary link pivotally connected to the first fixing pivot point, with the at least one ternary link providing a first movable pivot point arranged at a first slidable mold, with a second combination comprising the second binary link and providing a second movable pivot point arranged at a second slidable mold and located between the first fixing pivot point and the second fixing pivot point, with the third binary link pivotally connected to the second combination and to the at least one ternary link;
   wherein the at least one ternary link and the first, second and third binary links synchronously move the first movable pivot point and the second movable pivot point toward or away from each other in opposite directions.

2. The multi-rod mechanism as defined in claim 1, wherein the first fixing pivot point is arranged at a first fixed seat.

3. The multi-rod mechanism as defined in claim 1, wherein the second fixing pivot point is arranged at a second fixed seat.

4. The multi-rod mechanism of claim 1 wherein the second and third binary links are pivotally connected together at the second movable pivot point.

5. The multi-rod mechanism of claim 4 further comprising a fourth binary link, with the fourth binary link pivotally connected to the second fixing pivot point and to the second binary link.

6. The multi-rod mechanism of claim 1 further comprising another ternary link pivotally connected to the second fixing pivot point, with the second binary link pivotally connected to the second movable pivot point and to the other ternary link, and with the third binary link pivotally connected to the other ternary link spaced from the second fixing pivot point and the second binary link.

7. A multi-rod mechanism comprising:
- a first ternary link corresponding to a first fixing pivot point, wherein the first ternary link includes a first connection point, a second connection point and a third connection point, wherein the third connection point of the first ternary link is formed with a first movable pivot point;
- a second ternary link corresponding to a second fixing pivot point;
- a first binary link, wherein the first binary link includes a first connection point and a second connection point, wherein the first connection point of the first ternary link is pivotally connected with the first connection point of the first binary link, wherein the second connection point of the first binary link is formed with the first fixing pivot point;
- a second binary link, wherein the second binary link includes a first connection point and a second connection point, wherein the second connection point of the first ternary link is pivotally connected with the first connection point of the second binary link;
- wherein the second ternary link includes a first connection point, a second connection point and a third connection point, wherein the first connection point of the second ternary link is formed with the second fixing pivot point, wherein the second connection point of the second ternary link is pivotally connected with the second connection point of the second binary link; and
- a third binary link, wherein the third binary link includes a first connection point and a second connection point, wherein the third connection point of the second ternary link is pivotally connected with the first connection point of the third binary link, wherein the second connection point of the third binary link is formed with the second movable pivot point, wherein the first ternary link, the second ternary link and the first, second and third bins links are connected between the first fixing pivot point and the second fixing pivot point to form a combination of the first ternary link, the second ternary link and the binary links, and the combination of the first ternary link, the second ternary link and the binary links being designed to provide the first movable pivot point and the second movable pivot point between the first fixing pivot point and the second fixing pivot point; and
- wherein, in operation, the first ternary link, the second ternary link and the binary links are actuated to move the first movable pivot point and the second movable pivot point toward or away from each other in opposite directions.

8. The multi-rod mechanism as defined in claim 7, wherein the first fixing pivot point is arranged at a first fixed seat.

9. The multi-rod mechanism as defined in claim 7, wherein the second fixing pivot point is arranged at a second fixed seat.

10. The multi-rod mechanism as defined in claim 7, wherein the first movable pivot point is arranged at a first slidable mold.

11. The multi-rod mechanism as defined in claim 7, wherein the second movable pivot point is arranged at a second slidable mold.

12. A multi-rod mechanism comprising:
- a ternary link, wherein the ternary link includes a first connection point, a second connection point and a third connection point, wherein the third connection point of the ternary link is formed with a first movable pivot point;
- a first binary link, wherein the first binary link includes a first connection point and a second connection point, wherein the first connection point of the ternary link is pivotally connected with the first connection point of the first binary link, wherein the second connection point of the first binary link is formed with a first fixing pivot point;
- a second binary link, wherein the second binary link includes a first connection point and a second connection point, wherein the second connection point of the ternary link is pivotally connected with the first connection point of the second binary link;
- a third binary link, wherein the third binary link includes a first connection point and a second connection point, wherein the second connection point of the third binary link and the second connection point of the second binary link are pivotally connected to form a second movable pivot point; and
- a fourth binary link, wherein the fourth binary link includes a first connection point and a second connection point, wherein the second connection point of the fourth binary link is pivotally connected with the first connection point of the third binary link, wherein the first connection point of the fourth binary link is formed with a second fixing pivot point, with the ternary link and the binary links being connected between the first fixing pivot point and the second fixing pivot point to form a combination of the ternary link and the binary links;
- wherein the combination of the ternary link and the binary links provides the first movable pivot point and the second movable pivot point between the first fixing pivot point and the second fixing pivot point; and
- wherein the ternary link and the binary links move the first movable pivot point and the second movable pivot point toward or away from each other in opposite directions.

13. The multi-rod mechanism as defined in claim 12, wherein the first fixing pivot point is arranged at a first fixed seat.

14. The multi-rod mechanism as defined in claim 12, wherein the second fixing pivot point is arranged at a second fixed seat.

15. The multi-rod mechanism as defined in claim 12, wherein the first movable pivot point is arranged at a first slidable mold.

16. The multi-rod mechanism as defined in claim 12, wherein the second movable pivot point is arranged at a second slidable mold.

* * * * *